United States Patent
Kreczinski et al.

(10) Patent No.: US 10,633,401 B2
(45) Date of Patent: *Apr. 28, 2020

(54) PROCESS FOR PREPARING ISOCYANATES CONTAINING ALKOXYSILANE GROUPS

(71) Applicant: Evonik Operations GmbH, Essen (DE)

(72) Inventors: Manfred Kreczinski, Herne (DE); Stephan Kohlstruk, Gladbeck (DE); Emmanouil Spyrou, Schermbeck (DE); Dirk Hoppe, Nottuln (DE)

(73) Assignee: Evonik Operations GmbH, Essen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/354,753

(22) Filed: Mar. 15, 2019

(65) Prior Publication Data

US 2019/0300550 A1 Oct. 3, 2019

(30) Foreign Application Priority Data

Mar. 28, 2018 (EP) .................... 18164574

(51) Int. Cl.
| | | |
|---|---|---|
| C07F 7/18 | (2006.01) | |
| C07F 7/20 | (2006.01) | |
| C08G 18/71 | (2006.01) | |
| C09D 175/04 | (2006.01) | |
| C09J 175/04 | (2006.01) | |
| C09K 3/10 | (2006.01) | |

(52) U.S. Cl.
CPC .......... *C07F 7/1892* (2013.01); *C07F 7/1804* (2013.01); *C07F 7/20* (2013.01); *C08G 18/718* (2013.01); *C09D 175/04* (2013.01); *C09J 175/04* (2013.01); *C09K 3/1021* (2013.01); *C09K 2200/065* (2013.01)

(58) Field of Classification Search
None
See application file for complete search history.

(56) References Cited

U.S. PATENT DOCUMENTS

| | | |
|---|---|---|
| 3,598,852 A | 8/1971 | Berger |
| 3,821,218 A | 6/1974 | Berger |
| 4,654,428 A | 3/1987 | Kurashima et al. |
| 4,697,009 A | 9/1987 | Deschler et al. |
| 5,218,133 A | 6/1993 | Pepe et al. |
| 5,393,910 A | 2/1995 | Mui et al. |
| 5,616,762 A | 4/1997 | Kropfgans et al. |
| 5,886,205 A | 3/1999 | Uchida et al. |
| 6,008,396 A | 12/1999 | Sheridan et al. |
| 9,309,271 B2 | 4/2016 | Simandan et al. |
| 9,663,539 B2 | 5/2017 | Vu et al. |
| 9,862,673 B2 | 1/2018 | Rüfer et al. |
| 9,868,702 B2 | 1/2018 | Rüfer et al. |
| 10,093,605 B2 | 10/2018 | Bajus et al. |
| 10,093,765 B2 | 10/2018 | Stache et al. |
| 10,093,826 B2 | 10/2018 | Stache et al. |
| 10,125,089 B2 | 11/2018 | Kohlstruk et al. |
| 10,160,717 B2 | 12/2018 | Rüfer et al. |
| 10,173,979 B2 | 1/2019 | Rüfer et al. |
| 10,214,612 B2 | 2/2019 | Langkabel et al. |
| 10,221,277 B2 | 3/2019 | Langkabel et al. |
| 2007/0032673 A1* | 2/2007 | Sheridan ............... C07F 7/1892 556/466 |
| 2016/0009738 A1 | 1/2016 | Vu et al. |
| 2017/0298003 A1 | 10/2017 | Rittsteiger et al. |
| 2017/0320896 A1* | 11/2017 | Stanjek ............... B01J 31/0212 |
| 2017/0355810 A1 | 12/2017 | Langkabel et al. |
| 2017/0369626 A1 | 12/2017 | Stache et al. |
| 2017/0369736 A1 | 12/2017 | Stache et al. |
| 2018/0155515 A1 | 6/2018 | Spyrou et al. |
| 2018/0312713 A1 | 11/2018 | Spyrou et al. |
| 2018/0327538 A1 | 11/2018 | Lomölder et al. |
| 2018/0339959 A1 | 11/2018 | Rittsteiger et al. |

FOREIGN PATENT DOCUMENTS

| | | |
|---|---|---|
| DE | 35 24 215 A1 | 1/1987 |
| DE | 35 44 601 C2 | 11/1992 |

(Continued)

OTHER PUBLICATIONS

Rüfer et al., U.S. Appl. No. 16/177,863, filed Nov. 1, 2018.

(Continued)

*Primary Examiner* — Clinton A Brooks
*Assistant Examiner* — Kofi Adzamli
(74) *Attorney, Agent, or Firm* — Nexsen Pruet PLLC; Philip P. McCann

(57) ABSTRACT

The invention relates to a process for preparing isocyanate containing alkoxysilane groups, in which, in the sequence of steps A) to D), A) alkoxysilano(cyclo)alkylamine is reacted with dialkyl carbonate in the presence of a basic catalyst to give alkoxysilano(cyclo)alkylurethane, B) simultaneously or successively, the catalyst is deactivated, and low boilers, solids, salt burdens and/or high boilers are removed, C) alkoxysilano(cyclo)alkylurethane obtained after B) is thermally cleaved to release isocyanate containing alkoxysilane groups and by-product, leaving bottoms material, and D) isocyanate containing alkoxysilane groups and by-product are separated from one another and from bottoms material and collected, wherein the process regime at least of steps C) to D) is continuous.

20 Claims, No Drawings

(56) References Cited

FOREIGN PATENT DOCUMENTS

EP 0 709 392 B1 5/2001
WO 2007/037817 A2 4/2007

OTHER PUBLICATIONS

European Search Report dated Jun. 11, 2018 in EP 18164574.8 (6 pages).
Kreczinski et al., U.S. Appl. No. 16/354,349, filed Mar. 15, 2019.
Kreczinski et al., U.S. Appl. No. 16/356,026, filed Mar. 18, 2019.
Kreczinski et al., U.S. Appl. No. 16/356,081, filed Mar. 18, 2019.

* cited by examiner

PROCESS FOR PREPARING ISOCYANATES CONTAINING ALKOXYSILANE GROUPS

CROSS REFERENCE TO RELATED APPLICATIONS

This application is a 35 U.S.C. § 119 patent application which claims the benefit of European Application No. 18164574.8 filed Mar. 28, 2018, which is incorporated herein by reference in its entirety.

FIELD

The invention relates to a process for preparing isocyanates containing alkoxysilane groups.

BACKGROUND

Isocyanates containing alkoxysilane groups are usable in a versatile manner as heterofunctional units and may find use, for example, in coatings, sealants, adhesives and elastomer materials, but are not limited to these fields of use.

Processes for preparing isocyanates containing alkoxysilane groups are known. For example, they can be obtained by reacting alkoxysilanoalkylamines with phosgene in the presence of tertiary amines (DE 35 44 601 C2, U.S. Pat. No. 9,309,271 B2), although not only the toxicity of phosgene but also the formation of chlorinated by-products and salts is disadvantageous.

Alternatively, access to isocyanates containing alkoxysilane groups can also be achieved via hydrosilylation of isocyanates containing olefin groups in the presence of precious metal catalysts (EP 0 709 392 B1). Disadvantages here are generally inadequate selectivity and high catalyst demand.

A further route to alkoxysilane-containing isocyanates leads via the reaction of haloalkylalkoxysilanes with metal cyanates to form alkoxysilanoalkylurethanes and subsequent thermal cleavage of the urethanes to release the corresponding isocyanates (U.S. Pat. Nos. 3,821,218 A, 3,598,852 A, DE 35 24 215 A1). Disadvantages here are the formation of large amounts of salt and the need to use a solvent, which is typically dimethylformamide.

U.S. Pat. No. 5,218,133 A describes a route to preparation of alkoxysilanoalkylurethanes that avoids the troublesome formation of stoichiometric amounts of salt. For this purpose, alkoxysilanoalkylamines are reacted with alkyl carbonates in the presence of basic catalysts, especially in the presence of metal alkoxides, and the reaction mixture is then neutralized.

Alternatively, the deactivation of the basic catalyst in the reaction mixture can also be conducted with halogenated neutralizing agents (WO 2007/037817 A2). However, these have the disadvantage of leading, in the cleavage reaction described hereinafter, to highly corrosive halogenated substances and neutralization products that make very high demands on the reactor materials and hence increase capital costs and maintenance costs.

U.S. Pat. No. 5,393,910 A describes a process for thermal cracking of alkoxysilanoalkylurethanes prepared preferably according to U.S. Pat. No. 5,218,133 A at high temperature in the gas phase. A disadvantage of this process is the need for special equipment which is stable to high temperature and thus costly. Moreover, patents that do not relate specifically to silanoisocyanates report that the high temperature required leads to reactor carbonization. This is disadvantageous because it is detrimental to plant availability.

As an alternative to urethane cleavage in the gas phase, the thermally induced release of isocyanates containing alkoxysilane groups can also be conducted in a dilute manner in inert solvents (see U.S. Pat. Nos. 5,886,205 A, 6,008,396 A). This involves adding the alkoxysilanoalkylurethane to the inert solvent and choosing a sufficiently high temperature for the solvent as to promote urethane cleavage on the one hand but to avoid unwanted side reactions as far as possible on the other hand. U.S. Pat. No. 5,886,205 A discloses, for the reaction performable in a batchwise or continuous manner, pH values of less than 8, temperatures of not more than 350° C. and a catalyst comprising at least one metal selected from Sn, Sb, Fe, Co, Ni, Cu, Cr, Ti and Pb or at least one metal compound comprising these metals. Disadvantages are the expenditure required for solvent cleaning by comparison with gas phase cleavage, and the unavoidable loss of solvent.

U.S. Pat. No. 9,663,539 B2 describes a process for preparing and subsequently thermally cleaving alkoxysilanoalkylurethanes with the aim of obtaining light-colored isocyanates containing alkoxysilane groups with high storage stability. What is disclosed is a process for preparing isocyanatoorganosilanes, in which a) an aminoorganosilane is reacted with an organic carbonate ester in the presence of a basic catalyst to give a silyl organocarbamate,
b) the pH of the mixture is adjusted to a pH of not less than 6.0 with an organic carboxylic acid,
c) the mixture obtained is stripped at a temperature of 80-130° C. in order to remove alcohol formed and in order to establish a carbonate ester content of less than about 5.0% by weight,
d) filtration of the mixture from c),
e) optional addition of an organic carboxylic acid in order to adjust the pH to not less than 6.0,
f) thermal cleavage of the mixture obtained in d) or e) in order to obtain an isocyanatoorganosilane and corresponding by-products,
g) separation of the isocyanatoorganosilanes from the by-products obtained in f) and
h) collection of the isocyanatoorganosilanes obtained in g).

Steps a) to c) can be each conducted batchwise or continuously. For step f) in particular, however, no continuous process regime is disclosed. A particular disadvantage of the process described is the lack of selectivity and hence inefficient raw material exploitation.

SUMMARY

The problem addressed by the present invention is thus that of avoiding the aforementioned disadvantages of the prior art. More particularly, the problem addressed by the present invention is that of providing a selective, resource-conserving and simple process for preparing isocyanates containing alkoxysilane groups in high yields.

DETAILED DESCRIPTION

It has now been found that, surprisingly, the present problem can be solved by the process according to the invention for preparing isocyanate containing alkoxysilane groups, in which, in the sequence of steps A) to D), A) alkoxysilano(cyclo)alkylamine is reacted with dialkyl carbonate in the presence of a basic catalyst (and with release of low boilers, solids, salt burdens and/or high boilers) to give alkoxysilano(cyclo)alkylurethane, B) simultaneously or successively
the catalyst is deactivated, and
low boilers, solids, salt burdens and/or high boilers are removed,
C) alkoxysilano(cyclo)alkylurethane obtained after B) is thermally cleaved to release isocyanate containing alkoxysilane groups and by-product, leaving bottoms material, and
D) isocyanate containing alkoxysilane groups and by-product are separated from one another and from cleavage bottoms material and collected, in which the process regime at least of steps C) to D) is continuous.

Here and hereinafter, a process for preparing isocyanate containing alkoxysilane groups from alkoxysilano(cyclo)alkylamine and dialkyl carbonate is understood to mean a process in which one or more alkoxysilano(cyclo)alkylamines and one or more dialkyl carbonates are first used to prepare one or more alkoxysilano(cyclo)alkylurethanes, which are subsequently converted thermally to one or more isocyanates containing alkoxysilane groups and one or more by-products, especially alcohols corresponding to the alkyl radical(s) of the dialkyl carbonate. Preferably, the process according to the invention is a process in which an alkoxysilano(cyclo)alkylamine and a dialkyl carbonate are first used to prepare an alkoxysilano(cyclo)alkylurethane, which is subsequently converted thermally to an isocyanate containing alkoxysilane groups and a by-product, especially the alcohol corresponding to the alkyl radical of a dialkyl carbonate.

The core difference in the process according to the invention from the processes disclosed in the prior art is that at least process steps C) and D) are continuous. It has been possible to date to conduct only steps A and B continuously, but especially not the cleavage step C). It is thus possible to perform the process in such a way that steps A) and B) are conducted batchwise and steps C) and D) continuously. It is also possible to conduct all steps A) to D) continuously. It is also conceivable to conduct just one of steps A) and B) batchwise and then to conduct steps C) and D) continuously.

Preferably, the continuous process regime of steps C) to D) is enabled here in that, in step C), the bottoms material is discharged wholly or partly from the cleavage apparatus, then subjected to thermal treatment and/or purification and/or an aftertreatment (reurethanization) in the presence of alcohol and fed back into step A), B) or C). By virtue of the bottoms material being removed and subjected to thermal treatment and/or purification and/or thermal reurethanization of isocyanates present in the bottoms material with alcohol, the high boiler content in the bottoms material is lowered and/or the proportion of values is increased. The stream removed that has been subjected to thermal treatment and/or purification and/or reurethanization is recycled into step A), B) or C) of the process. Preferably, discharge, thermal treatment and/or purification and/or aftertreatment with alcohol and feeding of the bottoms material is also conducted continuously. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

Preference is thus given to a process for preparing isocyanate containing alkoxysilane groups, in which, in the sequence of steps A) to D), A) alkoxysilano(cyclo)alkylamine is reacted with dialkyl carbonate in the presence of a basic catalyst (and with release of low boilers, solids, salt burdens and/or high boilers) to give alkoxysilano(cyclo)alkylurethane,
B) simultaneously or successively
the catalyst is deactivated, and
low boilers, solids, salt burdens and/or high boilers are removed,
C) alkoxysilano(cyclo)alkylurethane obtained after B) is thermally cleaved to release isocyanate containing alkoxysilane groups and by-product, leaving bottoms material, while
  i) the bottoms material is being wholly or partly discharged from the cleavage apparatus,
  ii) subjected to thermal treatment and/or purification and/or an aftertreatment/reurethanization in the presence of alcohol and
  iii) the material removed, after thermal treatment and/or purification and/or aftertreatment/reurethanization in step A), B) or C), is fed back, and
D) isocyanate containing alkoxysilane groups and by-product are separated from one another and from cleavage bottoms material and collected.

It has been found that, surprisingly, it is advantageous in the continuous preparation of isocyanates containing alkoxysilane groups from the corresponding alkoxysilano(cyclo)alkylamines to free the alkoxysilano(cyclo)alkylurethanes of low boilers and possible solids, salt burdens and high boilers after they have been synthesized by reaction of alkoxysilano(cyclo)alkylamines with dialkyl carbonates, to subject the alkoxysilano(cyclo)alkylurethanes thus purified to thermal cleavage to release the desired isocyanate containing alkoxysilane groups, to preferably continuously discharge a portion of the cleavage bottoms material from the cleavage apparatus and to subject it to a thermal aftertreatment, such that the high boiler component is reduced and the proportion of values in the mixture of matter is increased, to remove the high boiler components therefrom and to recycle the components of value into the process. It has been found that, in this way, a comparatively low steady-state concentration of high-boiling components is firstly achieved over the entire sequence of urethane synthesis, urethane purification and urethane cleavage, such that deposits, which are especially promoted by the high boiler components that are of relatively high viscosity by nature, can be avoided and good plant availability and a good process yield are ensured even over the long term. Secondly, the thermal aftertreatment—for example by reactive distillation—connected downstream of the thermal cleavage reaction has the advantage that it is surprisingly possible to achieve an additionally increased yield by comparison with the procedure without aftertreatment and more efficient raw material utilization is promoted in this way.

The umbrella term "alkoxysilano(cyclo)alkylamine" in the present context is especially understood to mean silanoalkylamines substituted on the silicon atom by alkoxy groups and optionally alkyl groups. The (cyclo)alkylamino group here may be an alkylamino group having a straight, branched or cyclic alkylene radical. The term "alkoxysilano(cyclo)alkylamines" thus encompasses alkoxysilanoalkylamines and alkoxysilanocycloalkylamines. The same applies to the resulting alkoxysilano(cyclo)alkylurethanes.

Preferably, the alkoxysilano(cyclo)alkylamine used in step A) has the formula (1)

$$R^3{}_m(OR^2)_{3-m}Si—R^1—NH_2 \qquad (1)$$

where $R^3$, $R^2$ and $R^1$ are each independently identical or different hydrocarbyl radicals having 1-6 carbon atoms, where these may be linear, branched or cyclic, and m is 0-2. Preferably, m is 0 and $R^1$ is methyl or propyl, and $R^2$ is methyl or ethyl.

Preferably, the dialkyl carbonate used is selected from dimethyl, diethyl, dipropyl and/or dibutyl carbonate. Further preferably, just one dialkyl carbonate selected from dimethyl, diethyl, dipropyl and/or dibutyl carbonate is used.

Preferably, the basic catalyst is a metal alkoxide. Preferably, the metal of the metal alkoxide is selected from Ca, K and Na, and the alkoxide is selected from methoxide, ethoxide, propoxide and butoxide.

Preferably, the molar ratio of alkoxysilano(cyclo)alkylamine and dialkyl carbonate is less than 1:5, preferably less than 1:3. Preferably, the reaction with dialkyl carbonate is conducted at a temperature of 5-100° C., preferably 15-85° C., over a period of 1-20 h, preferably 2-10 h. Preference is given to conducting the reaction at atmospheric pressure.

The reaction of the alkoxysilano(cyclo)alkylamines in reaction stage A) is preferably conducted in such a way that alkoxysilano(cyclo)alkylamines of the formula (1), optionally in a blend with alkoxysilano(cyclo)alkylurethanes of the formula (2) that especially originate from the bottoms material from the subsequent cleavage reaction,

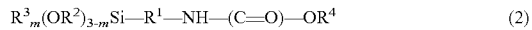

$$R^3_m(OR^2)_{3-m}Si—R^1—NH—(C{=}O)—OR^4 \qquad (2)$$

where $R^4$, $R^3$, $R^2$ and $R^1$ are each independently identical or different hydrocarbyl radicals having 1-6 carbon atoms, where these may be linear, branched or cyclic, and m is 0-2, are reacted in the presence of a metal alkoxide as catalyst with dialkyl carbonate at 5-100° C., preferably 15-85° C., over 1-20 h, preferably 2-10 h, where the molar ratio of alkoxysilano(cyclo)alkylamine and dialkyl carbonate is less than 1:5, preferably less than 1:3.

The optional blending of the alkoxysilano(cyclo)alkylurethane into the reaction mixture may precede the start of the reaction, or else take place in the course of reaction, at a single juncture or continuously. In addition, alcohol can be mixed into the reaction mixture in an analogous manner, preferably methanol, ethanol, propanal, butanol, pentanol or hexanol. Catalysts used are preferably alkali metal or alkaline earth metal alkoxides. Examples are methoxides, ethoxides, propoxides, butoxides, pentoxides or hexoxides of calcium, sodium, potassium, lithium or magnesium. The amount of catalyst is preferably between 0.01-2% by weight, preferably 0.05-1% by weight, based on the total amount of all other components involved in the reaction mixture.

The reaction can be conducted in a batchwise reactor, in a continuously operated stirred tank or in a tubular reactor. Preference is given to conducting the reactor in a continuously operated stirred tank or in a tubular reactor.

In step B), simultaneously or successively, the catalyst is deactivated, and low boilers, solids, salt burdens and/or high boilers are removed. It is thus possible first to deactivate the catalyst and then to remove low boilers, solids, salt burdens and/or high boilers. It is also possible first to remove low boilers, solids, salt burdens and/or high boilers and then to deactivate the catalyst. It is also possible to conduct both component steps simultaneously. However, preference is given to first deactivating the catalyst and then removing low boilers, solids, salt burdens and/or high boilers.

The deactivation of the catalyst in step B) can preferably be effected via a neutralization. Preference is given to neutralizing the catalyst with acid, preferably a poly- or monocarboxylic acid having 1-20 carbon atoms. Preference is given to neutralizing the catalyst with acetic acid and further preferably in a stoichiometric excess, based on the amounts of the catalyst used in A).

The neutralization of the reaction mixture converted with acid is preferably conducted in a molar ratio of acid and catalyst of 0.6:1 to 4:1, preferably 0.9:1 to 3.5:1. Care is taken here to keep the temperature of the reaction mixture between 5° C. and 85° C., preferably between 15° C. and 75° C. For compliance with the temperature window, the reaction mixture can be subjected to active cooling, for example by means of heat exchangers, or the evolution of temperature is controlled via the rate of metered addition of the neutralizing agent. Neutralizing agents used are preferably acids. Preference is given to acetic acid, propanoic acid, butanoic acid, hexanoic acid, succinic acid, benzenesulfonic acids, octanesulfonic acid, benzoic acid, nitrobenzoic acid, chlorobenzoic acid, maleic acid, sebacic acid, chloroacetic acid, citric acid, hexanedioic acid, dimer fatty acid, dibutylphosphoric acid and di(2-ethylhexyl)phosphoric acid. It is also possible to use ionic liquids, for example 1-butyl-3-methylimidazolium hydrogensulfate, for neutralization, and likewise mixtures of the aforementioned utilizing agents.

Preference is given to conducting the removal of the low boilers, solids, salt burdens and/or high boilers in three separate component steps. Further preferably, the low boilers can be removed by distillation, the solids and/or salt burdens via filtration or centrifugation, and the high boilers via thin-film evaporation. Preference is given to first removing the low boilers by distillation, then filtering or centrifuging off the solids and/or salt burdens, and finally removing the high boilers via thin-film evaporation.

The distillative removal of the low boilers, preferably consisting of alcohol and dialkyl carbonate, is conducted preferably at temperatures of 40-200° C., further preferably at 50-180° C., most preferably at 55-75° C., under reduced pressure.

The low boilers, for example the alcohol released in the course of the reaction and excess dialkyl carbonate, can be removed by distillation preferably at 40-200° C., further preferably at 50-180° C., especially preferably at 55-75° C., at preferably 20-800 mbar, further preferably 40-600 mbar. The removal can be conducted in one or more stages. This can in principle be effected in batchwise mode with a distillation column placed on top, but preference is given to using falling-film evaporators, thin-film evaporators or circulation evaporators.

The filtration or centrifugation is preferably conducted at temperatures of 30-90° C., further preferably at 50-70° C., most preferably at 60° C.

The filtration can be effected via membranes, adsorbers or fiber mats, by vacuum filtration or pressure filtration, within a temperature range of 30-90° C., preferably 50-70° C., more preferably at 60° C. As an alternative to filtration, the separation of solid phase and liquid phase can also be conducted with the aid of a centrifuge.

Impurities that have not been removed sufficiently by filtration or centrifugation can be removed by a further purification. For this purpose, the mixture is run through a short-path or thin-film evaporator at a pressure of 1-30 mbar, preferably 2-20 mbar, and at a temperature of 80-220° C., preferably 100-200° C., such that distillate and efflux are obtained in a ratio of greater than 80% by weight to 20% by weight, preferably 85% by weight to 15% by weight.

The thin-film evaporation of the filtrate or permeate obtained is preferably conducted at a pressure of 1-30 mbar, preferably 2-20 mbar, and a cut ratio of distillate/residue of greater than 80% by weight to 20% by weight, preferably greater than 85% by weight to 15% by weight. The residue can preferably be recycled into the urethane synthesis A) or the purification step B). Preferably, the residue is guided into the urethane synthesis A) or into the filtration/centrifugation step B) iii).

The thermal cleavage C) gives rise to isocyanate containing alkoxysilane groups and by-product, preferably alcohol. Preference is given to conducting the thermal cleavage without addition of solvent.

The thermal cleavage in step C) is preferably conducted in the presence of a catalyst, continuously and without solvent, at a temperature of 150 to 280° C., preferably 165 to 265° C., and under a pressure of 0.5-200 mbar, preferably 1.0-100 mbar. The catalyst concentration is preferably 0.5-100 ppm, preferably 1-60 ppm, more preferably 2-30 ppm.

In the thermal cleavage, preference is given to discharging a portion of the reaction mixture constantly from the bottom, preferably 1 to 90% by weight based on the feed, preferably 5% to 60% by weight based on the feed. Correspondingly, corresponding amounts of bottoms material are preferably discharged from the cleavage apparatus.

The thermal cleavage is preferably effected partially, meaning that the conversion of product from step B)/distillate to isocyanate containing alkoxysilane groups is chosen freely and is typically within a range of 10-95% by weight, preferably 20-85% by weight, of the amount supplied (feed). Preferably, a portion of the reaction mixture comprising not only unconverted urethane of the formula (2) but also high-boiling by-products and other reutilizable and unutilizable by-products is discharged continuously from the bottom. The volume of the discharge is guided by factors including the desired conversion and the desired capacity of the cleavage reaction and can easily be determined experimentally. It is typically 1% to 90% by weight, preferably 5% to 60% by weight, based on the feed.

Catalysts employed for chemical cleavage of the urethanes containing alkoxysilane groups are, for example, the inorganic and organic compounds that catalyse urethane formation. Preference is given to using chlorides of zinc or of tin and oxides of zinc, manganese, iron or cobalt, where the catalyst is metered into the stream of matter from purification step B) comprising essentially urethane, especially the stream of matter from step B) iv) and any other recycled streams before they are fed into the cleavage, in the form of a 0.01-25% by weight, preferably 0.05-10% by weight, solution or suspension in alcohol, in an amount of 0.5-100 ppm, preferably 1-60 ppm, more preferably 2-30 ppm. In principle, but not preferably, the urethane cleavage can also be conducted without added catalyst. It has been found that, surprisingly, a low catalyst concentration promotes the selectivity of the chemical conversions that take place in the cleavage bottoms in favor of the desired thermal cleavage with release of the target product, whereas both excessively high catalyst concentrations and the absence of the cleavage catalyst lead to elevated by-product formation. The optimal catalyst concentration can easily be ascertained experimentally on the basis of this observation.

Suitable cleavage apparatuses are preferably cylindrical cleavage reactors, for example tubular ovens or preferably evaporators, for example falling-film, thin-film or bulk evaporators, for example Robert evaporators, Herbert evaporators, Caddle-type evaporators, Oskar evaporators and heating cartridge evaporators.

The important factor is basically to keep the average residence time of the isocyanate groups that are inevitably released in the deblocking of the alcohol in the cleavage zone as short as possible and hence to restrict unwanted side reactions to a minimum. Preferably, the cleavage is conducted in a combined cleavage and rectification column which, for the supply of energy, is equipped at the bottom with a falling-film evaporator, in the upper part with a device for drawing off product or crude product, and at the top with a condenser for the reflux and the drawing-off of alcohol. Optionally, devices for additional energy input can also be installed in the lower third.

The cleavage products formed in the thermal cleavage, composed in particular of alcohol and isocyanate containing alkoxysilane groups, may preferably be separated by rectification at temperatures of 150-280° C., preferably 165-265° C., and a pressure of 0.5-200 mbar, preferably 1-100 mbar, in the alcohol and isocyanate containing alkoxysilane groups, where the isocyanate may possibly still contain proportions of the underlying urethane. This separation can be conducted, for example, in the cleavage column of the abovementioned combined cleavage and rectification column.

The bottoms material comprising high boilers from the cleavage apparatus, after discharge, can preferably be subjected to thermal treatment and/or purified and/or subjected to an aftertreatment in the presence of alcohol, and is then preferably fed into step A), B) or C) again. This can reduce the high boiler content and increase the proportion of values in the mixture of matter. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

More preferably, the thermally treated and/or purified and/or alcohol-aftertreated bottoms material is fed back into step B) or C), since deposits in the urethane synthesis can then be avoided and the yields are higher.

The thermal aftertreatment is preferably effected at a temperature of 150-250° C. over a period of 0.2 to 4 h, further preferably at 190-250° C. over a period of 0.5-1.5 h at standard pressure.

The purification step is preferably effected by distillation. This is preferably done by distilling the discharged bottoms material under reduced pressure and at a temperature of 150-250° C., such that the alkoxysilano(cyclo)alkyl isocyanate and/or alkoxysilano(cyclo)alkylurethane formed in the bottoms is separated from the high boilers. The resultant distillate can be fed to step B) or C) of the process. Preferably, the distillate obtained is fed to the thin-film evaporation B) iv) or the cleavage C).

The bottoms discharged from the cleavage stage C) contains, as well as unconverted urethane, additionally high-boiling by-products and other reutilizable and unutilizable by-products. The reutilizable component, i.e. the values component of the mixture of matter—and hence the overall yield of the process—can be increased by controlled thermal aftertreatment in combination with a distillative purification, especially by reactive distillation, of the material. The material is separated into a values stream and a waste stream, with discharge of the waste stream which is rich in high boilers from the process, which is discarded or recycled. Preferably, the workup of the bottoms material via thermal treatment and purification is a reactive distillation.

The discharged bottoms material comprising alkoxysilano(cyclo)alkyl isocyanate and/or alkoxysilano(cyclo)alkylurethane can further preferably, with or without a prior purification step, be subjected to an optional further aftertreatment in order to increase the values content of the mixture of matter. For this purpose, the optionally distilled bottoms material is converted in the presence of an alcohol of the formula R²OH with R²=linear, branched or cyclic hydrocarbyl radical having 1-6 carbon atoms at 25-100° C. in the presence or absence of a catalyst. Useful catalysts include all solid-state catalysts that promote the NCO/OH reaction, e.g. tin octoate, dibutyltin laurate, tin dichloride, zinc dichloride or triethylamine. The molar ratio of NCO groups and OH groups is preferably up to 1:100, preferably up to 1:60 and more preferably up to 1:30. The reaction can be conducted in a batch reactor, a cascade, or else a tubular reactor in the absence or presence of a catalyst. Preference is given to conducting the reaction in a cascade or in a tubular reactor. Alkoxysilano(cyclo)alkyl isocyanates formed are converted here to the corresponding urethanes ("reurethanization"). The resultant product stream can preferably be sent to the urethane synthesis A), the purification step B) or the cleavage C). More preferably, the resultant product stream can be sent to the urethane synthesis A), the distillation step B) ii) or the cleavage C). Excess alcohol is preferably removed wholly or partly at the same time.

The steps of thermal aftertreatment and separation into values stream and waste stream and reurethanization can be conducted successively or in parallel. A batch reactor, for example, is suitable for the thermal aftertreatment, wherein the components can be separated thereafter in a distillation column or with the aid of a falling-film, short-path or thin-film evaporator. Less preferably, the separating operation can also be effected by extraction. Alternatively, the steps can also be effected in a falling-film, thin-film or short-path evaporator, and it is also possible to use multiple evaporators connected in series or in parallel.

The thermal aftertreatment can be effected in the presence or absence of typical urethanization catalysts. It is also possible to dispense with thermal aftertreatment entirely, but this measure sacrifices yield potential.

With a given capacity, for an optimized increase in the values content, the parameters of residence time and temperature in the thermal aftertreatment are among the crucial parameters, the optimum of which depends on the dimensions and basic setup of the process configuration and can easily be ascertained experimentally by the person skilled in the art.

In a particularly preferred variant of the invention, the bottoms discharge from the cleavage stage C) is subjected to a thermal aftertreatment with subsequent separation/purification, with recycling of the distillate containing the values into the process.

In step D), isocyanate containing alkoxysilane groups and by-product, preferably alcohol, is separated from bottoms material and collected. Further preferably, isocyanate containing alkoxy silane groups and by-product is separated from one another, preferably by rectification.

Further preferably, the isocyanate obtained by rectification is additionally purified and isolated by distillation ("pure isocyanate").

The isocyanate containing alkoxysilane groups which is preferably obtained by rectification can optionally be purified further by distillation at a temperature of 80-220° C., preferably 100-200° C., and under a pressure of 0.5-200 mbar, preferably 1-100 mbar, and isolated as a product of high purity. In this case too, it is preferably possible to continuously discharge a portion of distillation bottoms and combine it with the discharged bottoms material from the cleavage C).

The isocyanates preparable by the process preferably have the formula (3)

$$R^3{}_m(OR^2)_{3-m}Si{-\!\!-}R^1{-\!\!-}NCO \qquad (3)$$

where $R^3$, $R^2$ and $R^1$ are each independently identical or different hydrocarbyl radicals having 1-6 carbon atoms, which may be branched or cyclic, or else may be integrated together to form a cyclic system, and m is 0-2. Preferably, m=0. $R^1$ is preferably propyl. $R^2$ is preferably methyl or ethyl. Very particular preference is given to compounds where m is 0 and $R^1$ is methyl or propyl, and $R^2$ is methyl or ethyl.

The process according to the invention is very particularly suitable for preparation of isocyanatopropyltrimethoxysilane and isocyanatopropyltriethoxysilane.

Advantages of the process according to the invention are in particular that isocyanates containing alkoxysilane groups can be prepared with high plant availability in continuous operation with high yields. What is advantageous about the multistage process according to the invention is particularly the fact that, when alkoxysilano(cyclo)alkylamines of the formula (1) are used as starting material for the continuous preparation of isocyanates containing alkoxysilane groups, deposits that are promoted particularly by the high-boiling components that are of relatively high viscosity by nature can be largely avoided and good plant availability and a good process yield is assured even over the long term. In addition, it is an advantage of the multistage process according to the invention that it allows the process yield to be additionally increased owing to the downstream thermal aftertreatment—for example by reactive distillation—and promotes more efficient raw material utilization in this way.

The above-described optional sequence of thermal aftertreatment—for example by reactive distillation, bottoms discharge, separation into values and wastes, urethanization of the values and recycling of the reurethanized values stream into the process can in principle also be conducted in the following sequence: urethanization of the bottoms discharge, thermal aftertreatment, separation into values and wastes, and recycling into the process.

The multistage process according to the invention for continuous preparation of isocyanates containing alkoxysilane groups with recycling and discharge of the by-products can ensure a process that runs without disruption with high selectivity for a long period. The process according to the invention is suitable for preparation of isocyanates containing alkoxysilane groups and having 1-16 carbon atoms between the silicon atom and the isocyanate group, but especially for preparation of isocyanatopropyltrimethoxysilane and isocyanatopropyltriethoxysilane.

The isocyanates containing alkoxysilane groups that have been prepared are suitable for use in coatings on different substrates, sealants, adhesives and elastomer materials—or else for specific modification of resins or discrete molecules—but without being restricted to these fields of use.

The invention is elucidated in detail by the following examples:

Example 1

Inventive Preparation of 3-(Trimethoxysilyl)Propyl Isocyanate—Reurethanization of the Bottoms Discharge and Recycling into the Filtration 11.50 kg of AMMO (aminopropyltrimethoxysilane) were reacted with 8.10 kg of DMC (dimethyl carbonate) in the presence of 0.12 kg of a 30% solution of sodium methoxide in methanol at 60° C. for 6 h, and then neutralized by addition of 0.08 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream was subjected to a further purification step by thin-film evaporation at 185° C. and 5 mbar. The TFE distillate (17.52 kg/h) was run continuously into the circulation of the cleavage column and rectification column, and the deblocking reaction was conducted at a temperature of 195° C. and a bottom pressure of 60 mbar in the presence of a steady-state concentration of tin dichloride of 50 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS was withdrawn at the side draw with a purity of >98% in an amount of 11.04 kg/h, which corresponds to a continuous yield of 82%. To maintain the mass balance within the cleavage column and rectification column, and for avoidance of deposits and possibly blockage of the cleavage apparatus, and for regeneration of values, a substream was continuously discharged from the circuit, cooled down and combined with methanol, and the combined stream (8.0 kg/h) was converted in a tubular reactor at 65° C. until urethanization of all NCO groups was complete. The reurethanizate stream was recycled into the filtration stage.

Example 2

Inventive Preparation of 3-(trimethoxysilyl)propyl isocyanate—Thermal Aftertreatment and Separation of the Bottoms Discharge, Reurethanization and Recycling into the Urethane Preparation 12.10 kg of AMMO (aminopropyltrimethoxysilane) were reacted with 7.60 kg of DMC (dimethyl carbonate) in the presence of 0.12 kg of a 30% solution of sodium methoxide in methanol at 60° C. for 6 h, and then neutralized by addition of 0.08 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream was subjected to a further purification step by thin-film evaporation at 185° C. and 5 mbar. The residue was recycled into the next urethane preparation. The TFE distillate (18.85 kg/h) was run continuously into the circulation of the cleavage column and rectification column, and the deblocking reaction was conducted at a temperature of 195° C. and a bottom pressure of 60 mbar in the presence of a steady-state concentration of tin dichloride of 30 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS (3-(trimethoxysilyl)propyl isocyanate) was withdrawn at the side draw with a purity of >98% in an amount of 12.16 kg/h, which corresponds to a continuous yield of 86%. To maintain the mass balance within the cleavage column and rectification column, and for avoidance of deposits and possibly blockage of the cleavage apparatus, and for regeneration of values, a substream was continuously discharged from the circuit and run through a thin film evaporator at 215° C. and 5 mbar. The distillate stream was combined with methanol, and the combined stream (8.8 kg/h) was converted in a tubular reactor at 65° C. until urethanization of all NCO groups was complete. The reurethanizate stream was recycled into the urethane preparation.

Example 3

Inventive Preparation of 3-(trimethoxysilyl)propyl isocyanate (IPMS)—Thermal Aftertreatment and Separation of the Bottoms Discharge and Recycling into the Urethane Cleavage 14.29 kg of AMMO (aminopropyltrimethoxysilane) were reacted with 9.34 kg of DMC (dimethyl carbonate) in the presence of 0.17 kg of a 30% solution of sodium methoxide in methanol at 60° C. for 6 h, and then neutralized by addition of 0.09 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream (18.63 kg/h) was subjected to a further purification step by thin-film evaporation at 185° C. and 5 mbar. The residue was recycled into the next urethane preparation. The TFE distillate was run continuously into the circulation of the cleavage column and rectification column, and the deblocking reaction was conducted at a temperature of 195° C. and a bottom pressure of 60 mbar in the presence of a steady-state concentration of tin dichloride of 25 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS (3-(trimethoxysilyl)propyl isocyanate) was withdrawn at the side draw with a purity of >98% in an amount of 14.89 kg/h, which corresponds to a continuous yield of 89%. To maintain the mass balance within the cleavage column and rectification column, and for avoidance of deposits and possibly blockage of the cleavage apparatus, and for regeneration of values, a substream was continuously discharged from the circuit, subjected to thermal aftertreatment at 220° C. with a residence time of 1 h, and then run through a thin film evaporator at 5 mbar. The distillate stream was recycled into the circuit.

Comparative Example 1

Preparation of 3-(trimethoxysilyl)propyl isocyanate—No Bottoms Discharge and Recycling into the Process (Noninventive)

12.22 kg of AMMO (aminopropyltrimethoxysilane) were reacted with 7.91 kg of DMC (dimethyl carbonate) in the presence of 0.14 kg of a 30% solution of sodium methoxide in methanol at 60° C. for 6 h, and then neutralized by addition of 0.08 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream was subjected to a further purification step by thin-film evaporation at 185° C. and 5 mbar. The TFE distillate was run continuously into the circulation of the cleavage column and rectification column, and the deblocking reaction was conducted at a temperature of 195° C. and a bottom pressure of 60 mbar in the presence of a steady-state concentration of tin dichloride of 110 ppm.

The cleavage gases IPMS (3-(trimethoxysilyl)propyl isocyanate) and methanol were condensed out in two successive condensers.

It was not possible to maintain a continuous mode of operation since it was found to be impossible to maintain the mass balance between the cleavage column and rectification column. It was not possible to balance the input (TFE distillate stream) and output (cleavage gas stream) over a prolonged period, and so, over the course of time, either too much material collected in the cleavage equipment and there was overflow or the discharge stream of IPMS (3-(trimethoxysilyl)propyl isocyanate) gradually came to a stop.

Comparative Example 2

Batchwise Preparation of 3-(trimethoxysilyl)propyl isocyanate—Batchwise Deblocking (Noninventive)

13.39 kg of AMMO (aminopropyltrimethoxysilane) were reacted with 8.69 kg of DMC (dimethyl carbonate) in the presence of 0.16 kg of a 30% solution of sodium methoxide in methanol at 60° C. for 6 h, and then neutralized by addition of 0.09 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream was subjected to a further purification step by thin-film evaporation at 185° C. and 5 mbar. 350 g of the TFE distillate were heated to a temperature of 195° C. in a 3 l round-bottom flask with distillation apparatus, stirrer and thermometer in the presence of 110 ppm of tin dichloride and at a pressure of 60 mbar. The cleavage gases formed were separated by distillation and condensed out. After 6.5 h, the experiment was stopped after no product stream was obtained any longer in the distillation. A total of 209.1 g of IPMS (3-(trimethoxysilyl)propyl isocyanate) were obtained with a purity of 97.4% (about 67% yield); 95.2 g of high boilers remained in the round-bottom flask.

Comparative Example 3

Preparation of 3-(trimethoxysilyl)propyl isocyanate—with Bottoms Discharge and without Recycling into the Process (Noninventive)

12.90 kg of AMMO (aminopropyltrimethoxysilane) were reacted with 8.05 kg of DMC (dimethyl carbonate) in the presence of 0.15 kg of a 30% solution of sodium methoxide in methanol at 60° C. for 6 h, and then neutralized by addition of 0.08 kg of acetic acid. The reactor discharge was freed of the low boilers by thin-film evaporation at 140° C. and 250 mbar, the crude UPMS (methyl [3-(trimethoxysilyl)propyl]carbamate) was filtered through a cartridge filter at 50° C. and the filtrate stream was subjected to a further purification step by thin-film evaporation at 185° C. and 5 mbar. The TFE distillate (16.15 kg/h) was run continuously into the circulation of the cleavage column and rectification column, and the deblocking reaction was conducted at a temperature of 195° C. and a bottom pressure of 60 mbar in the presence of a steady-state concentration of tin dichloride of 110 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS (3-(trimethoxysilyl)propyl isocyanate) was withdrawn at the side draw with a purity of >98% in an amount of 9.00 kg/h, which corresponds to a continuous yield of 61%. To maintain the mass balance within the cleavage column and rectification column, and for avoidance of deposits and possibly blockage of the cleavage apparatus, a substream was continuously discharged from the circuit.

The invention claimed is:

1. A process for preparing isocyanate containing alkoxysilane groups comprising the sequence of steps A) to D),
   A) alkoxysilano(cyclo)alkylamine is reacted with dialkyl carbonate in the presence of a basic catalyst to give alkoxysilano(cyclo)alkylurethane,
   B) successively
      removing and/or deactivating the basic catalyst, and then
      removing low boilers by distillation,
      removing solids and salt burdens by filtration or centrifugation
      removing high boilers by thin-film evaporation,
   C) alkoxysilano(cyclo)alkylurethane obtained after B) is thermally cleaved to release isocyanate containing alkoxysilane groups and by-product, leaving bottoms material, and
   D) isocyanate containing alkoxysilane groups and by-product are separated from one another and from bottoms material and collected,
   wherein the process regime at least of steps C) to D) is continuous.

2. The process according to claim 1, wherein in step
   C) alkoxysilano(cyclo)alkylurethane obtained after B) is thermally cleaved to release isocyanate containing alkoxysilane groups and by-product, leaving bottoms material, while
      i) the bottoms material is being wholly or partly discharged from the cleavage apparatus,
      ii) subjected to thermal treatment and/or purification and/or an aftertreatment in the presence of alcohol and
      iii) the material removed, after thermal treatment and/or purification and/or aftertreatment in A), B) or C), is fed back.

3. The process according to claim 2, wherein the discharged bottoms material
   is subjected to thermal treatment at a temperature of 150-250° C. over a period of 0.2 to 4 h and/or
   is distilled under reduced pressure and at a temperature of 150-250° C. and/or
   is converted in the presence of an alcohol of the formula $R^2OH$ with $R^2$=linear, branched or cyclic hydrocarbyl radical having 1-6 carbon atoms at 25-100° C. in the presence or absence of a catalyst.

4. The process according to claim 3, wherein no reaction with alcohol is conducted.

5. The process according to claim 4, wherein the distillate obtained is sent to step B) or C).

6. The process according to claim 4, wherein the isocyanate obtained by rectification is additionally purified and isolated by distillation.

7. The process according to claim 2, wherein the alkoxysilano(cyclo)alkylamine has the formula (1)

$$R^a{}_m(OR^2)_{3-m}Si\text{—}R^1\text{—}NH_2 \tag{1}$$

where $R^3$, $R^2$ and $R^1$ are each independently identical or different hydrocarbyl radicals having 1-6 carbon atoms, where these may be linear, branched or cyclic, and m is 0-2.

8. The process according to claim 2, wherein the dialkyl carbonate used is selected from dimethyl, diethyl, dipropyl and dibutyl carbonate.

9. The process according to claim 2, wherein, in step B) in the sequence of steps i) to iv)
i) the catalyst is deactivated,
iii) solids and/or salt burdens are filtered off.

10. The process according to claim 2, wherein the thermal cleavage C) is conducted without solvent and in the presence of a catalyst at a temperature of 150-280° C. and a pressure of 0.5-200 mbar.

11. The process according to claim 10, wherein the catalyst concentration is 0.5-100 ppm.

12. The process according to claim 2, wherein, in step C), an amount of bottoms material corresponding to 5-60% by weight based on the feed is discharged from the bottom and added again in step A), B) or C).

13. The process according to claim 1, wherein the alkoxysilano(cyclo)alkylamine has the formula (1)

(1)

where $R^3$, $R^2$ and $R^1$ are each independently identical or different hydrocarbyl radicals having 1-6 carbon atoms, where these may be linear, branched or cyclic, and m is 0-2.

14. The process according to claim 1, wherein the dialkyl carbonate used is selected from dimethyl, diethyl, dipropyl and dibutyl carbonate.

15. The process according to claim 1, wherein, in step B) in the sequence of steps i) to iv)
i) the catalyst is deactivated,
iii) solids and/or salt burdens are filtered off.

16. The process according to claim 15, wherein the residue from the thin-film evaporation is recycled into the urethane synthesis A) or into the filtration/centrifugation step B) iii).

17. The process according to claim 1, wherein the thermal cleavage C) is conducted without solvent and in the presence of a catalyst at a temperature of 150-280° C. and a pressure of 0.5-200 mbar.

18. The process according to claim 17, wherein the catalyst concentration is 0.5-100 ppm.

19. The process according to claim 1, wherein, in step C), an amount of bottoms material corresponding to 1-90% by weight based on the feed is discharged from the bottom and added again in step A), B) or C).

20. The process according to claim 1, wherein the separation in step D) is a rectification.

* * * * *

UNITED STATES PATENT AND TRADEMARK OFFICE
CERTIFICATE OF CORRECTION

PATENT NO. : 10,633,401 B2
APPLICATION NO. : 16/354753
DATED : April 28, 2020
INVENTOR(S) : Manfred Kreczinski et al.

It is certified that error appears in the above-identified patent and that said Letters Patent is hereby corrected as shown below:

In the Claims

Column 14,
Claim 7, Line 62, "$R^a_m (OR^2)_{3-m}Si\text{-}R^1\text{-}NH_2$" should read -- $R^3_m (OR^2)_{3-m}Si\text{-}R^1\text{-}NH_2$ --.

Column 15,
Claim 13, Line 21, "$R^a_m (OR^2)_{3-m}Si\text{-}R^1\text{-}NH_2$" should read -- $R^3_m (OR^2)_{3-m}Si\text{-}R^1\text{-}NH_2$ --.

Signed and Sealed this
Twenty-sixth Day of May, 2020

Andrei Iancu
*Director of the United States Patent and Trademark Office*